| United States Patent [19] | [11] Patent Number: 4,730,675 |
| Wygant et al. | [45] Date of Patent: Mar. 15, 1988 |

[54] PLUGGING AN ABANDONED WELL WITH A POLYMER GEL

[75] Inventors: Noel D. Wygant, Sedalia; Robert D. Sydansk, Littleton, both of

[73] Assignee: Marathon Oil Company, Findlay, Ohio

[21] Appl. No.: 945,412

[22] Filed: Dec. 22, 1986

[51] Int. Cl.$^4$ ............................................. E21B 33/138
[52] U.S. Cl. ..................................... 166/295; 166/294; 166/300
[58] Field of Search ............... 166/250, 294, 295, 300; 405/264; 523/130, 132

[56] References Cited

U.S. PATENT DOCUMENTS

| Re. 32,114 | 4/1986 | Argabright et al. | 166/252 |
| 3,613,790 | 10/1971 | Stout et al. | 166/295 X |
| 3,978,928 | 9/1976 | Clampitt | 166/294 |
| 4,275,788 | 6/1981 | Sweatman | 166/295 X |

FOREIGN PATENT DOCUMENTS 642470  1/1979  U.S.S.R. ............................. 166/295

OTHER PUBLICATIONS

Shuttleworth and Russel, *Journal of the Society of Leather Trades' Chemists*, "The Kinetics of Chrome Tannage Part I.," U.K., 1965, v. 49, pp. 133–154; Part III., U.K., 1965, v. 49, pp. 251–260; Part IV., U.K., 1965, v. 49, pp. 261–268.

Von Erdman, *Das Leder*, "Condensation of Mononuclear Chromium (III) Salts to Polynuclear Compounds," Eduard Roether Verlag, Darmstadt, Germany, 1963, v. 14, p. 249.

Udy, Marvin J., *Chromium, vol. 1: Chemistry of Chromium and Its Compounds*, Reinhold Publ. Corp., N.Y., 1956, pp. 229–233.

Cotton and Wilkinson, *Advanced Inorganic Chemistry* 3rd Ed., John Wiley & Sons, Inc., N.Y., 1972, pp. 836–839.

*Primary Examiner*—George A. Suchfield
*Attorney, Agent, or Firm*—Jack L. Hummel; Rodney F. Brown

[57] ABSTRACT

An abandoned well penetrating a subterranean formation is plugged using a gel comprising a high molecular weight, water-soluble carboxylate-containing polymer and a chromic carboxylate complex crosslinking agent. The gel components are combined at the surface and injected into the wellbore to form a continuous single-phase gel therein.

14 Claims, No Drawings

PLUGGING AN ABANDONED WELL WITH A POLYMER GEL

BACKGROUND OF THE INVENTION

1. Technical Field

The invention relates to a process for plugging an abandoned well and more particularly to a process for plugging an abandoned well with a polymer gel wherein the wellbore penetrates a subterranean hydrocarbon-bearing formation.

2. Description of Related Art

Wells employed in the production of oil and gas are abandoned inter alia because they reach the end of their useful life or they become damaged beyond repair. State and federal regulations require that abandoned wells be plugged to protect safety and environmental interests. The well is commonly plugged by pumping Portland cement into the wellbore and curing the cement in situ.

Formulation of Portland cement in the field is largely a product of trial and error by field personnel to meet irregularities in the cementing composition and the downhole environment. Cement quality control is difficult to achieve under such conditions. As a result, Portland cement cured in situ can exhibit cracking, shrinking, or poor adhesion to wellbore tubulars. An imperfect Portland cement plug can enable undesirable fluid flow through the wellbore via leaks along or through the cement.

A process is needed which employs a plugging material having a broad range of highly controllable and predictable set-up times providing ease of operation and design at a relatively low cost. A process is needed employing a substitute material for Portland cement in conventional plugging processes which forms a more effective plug and seals the wellbore indefinitely.

SUMMARY OF THE INVENTION

The present invention provides a process for plugging an abandoned well. The well is plugged by means of a plugging material comprising a tailor-made crosslinked polymer gel. The gel contains a high molecular weight, water-soluble carboxylate-containing polymer and a chromic carboxylate complex crosslinking agent. The gel is prepared by forming a uniform gelation solution above ground containing the polymer and crosslinking agent, pumping the solution into a wellbore penetrating a hydrocarbon-bearing formation and curing the solution to a gel in the wellbore. The gelation solution may be advantageously designed to be at least partially gelled by the time it reaches the wellbore to inhibit or prevent its propagation into a less permeable subterranean material, such as a formation matrix, which may adjoin the wellbore face where no plugging is required. The gelation solution sets up in the wellbore without requiring the further injection of any additional components. The gel is a continuous single-phase material which substantially plugs the well.

The plugging material of the present invention generally outperforms Portland cement at a comparatively lower cost. The gelation solution, as initially injected into the wellbore, is a uniform solid-free solution which avoids bridging and reduces fluid loss. Biocides or other special chemicals can be readily incorporated into the gelation solution if desired.

The mature gel resulting from the solution forms a tenacious chemical bond with the rock of the wellbore face and the wellbore tubulars to provide a tight seal. The gel is substantially impermeable to subterranean fluids and permanent. It is resistant to in situ degradation and corrosion. The gel does not shrink or crack, yet is sufficiently deformable to fill microvoids in the treatment region. The gel is sufficiently strong to resist displacement from the plugged well by natural forces, but is sufficiently elastic to accommodate minor shifts in the earth's surface without cracking or faulting.

If it is desired to return an abandoned well to operation after plugging, the present process can be reversed by dissolving the gel with a suitable solvent and pumping the dissolved gel to the surface. Alternatively, the gel can be drilled out or mechanically removed with relative ease.

The gel employed in the present invention possesses a broad range of highly controllable and predictable set-up times and strengths. The process is applicable to a broad range of temperatures, salinities, rock formations, and environments. The practitioner can customize or tailor a gel for specific operational constraints, downhole characteristics and subsequent performance demands. One can predetermine the gelation rate and resultant gel strength and stability which are required of a gel to plug the wellbore. Thereafter, a gel having the required predetermined properties is produced under controlled conditions at the surface by utilizing observed correlations between specific controllable gelation parameters and resultant gel properties.

DESCRIPTION OF THE PREFERRED EMBODIMENTS

The present invention is described in the context of specific terms which are defined as follows. "Gel" as used herein is directed to a continuous three-dimensional crosslinked polymeric network having an ultra high molecular weight. The gel contains a liquid medium such as water which is confined within the solid polymeric network. The fusion of a liquid and a solid component into a single-phase system provides the gel with a unique phase behavior. Gels employed by the present invention have sufficient structure so as not to substantially propagate from the confines of a wellbore into a less permeable region of the formation adjoining the wellbore when injected into the wellbore. "Plugging" is the substantial prevention of fluid flow from a subterranean formation and through the wellbore.

"Partially gelled" solutions are also referred to herein. A partially gelled solution is at least somewhat more viscous than an uncrosslinked polymer solution such that it is incapable of entering a less permeable region where no treatment is desired, but sufficiently fluid such that it is capable of displacement into a desired treatment zone. The crosslinking agent of the partially gelled solution has reacted incompletely with the polymer with the result that neither all of the polymer nor all of the crosslinking agent in the gelation solution is totally consumed by the crosslinking reaction. The partially gelled solution is capable of further crosslinking to completion resulting in the desired gel without the addition of more crosslinking agent.

"Crosslinked to completion" means that the gel composition is incapable of further crosslinking because one or both of the required reactants in the initial solution are consumed. Further crosslinking is only possible if either polymer, crosslinking agent, or both are added to the gel composition.

The gel composition utilized in the present invention is comprised of a carboxylate-containing polymer and a crosslinking agent. The carboxylate-containing polymer may be any crosslinkable, high molecular weight, water-soluble, synthetic polymer or biopolymer containing one or more carboxylate species. The average molecular weight of the carboxylate-containing polymer is in the range of about 10,000 to about 50,000,000 and preferably about 100,000 to about 20,000,000, and most preferably about 200,000 to about 15,000,000.

Biopolymers useful in the present invention include polysaccharides and modified polysaccharides. Exemplary biopolymers are xanthan gum, guar gum, carboxymethylcellulose, o-carboxychitosans, hydroxyethylcellulose, hydroxypropylcellulose, and modified starches. Useful synthetic polymers include inter alia acrylamide polymers, such as polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al incorporated herein by reference.

The crosslinking agent is a chromic carboxylate complex. The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Representative formulae of such complexes include:

$[Cr_3(CH_3CO_2)_6(OH)_2]^{+1}$;
$[Cr_3(OH)_2(CH_3CO_2)_6]NO_3.6H_2O$;
$[Cr_3(H_2O)_2(CH_3CO_2)_6]^{+3}$;
$[Cr_3(H_2O)_2(CH_3CO_2)_6](CH_3CO_2)_3.H_2O$; etc.

Trivalent chromium and chromic ion are equivalent terms encompassed by the term chromium III species as used herein. The carboxylate species are advantageously derived from water-soluble salts of carboxylic acids, especially low molecular weight mono-basic acids. Carboxylate species derived from salts of formic, acetic, propionic, and lactic acid, lower substituted derivatives thereof and mixtures thereof are especially preferred. The carboxylate species include the following water-soluble species: formate, acetate, propionate, lactate, lower substituted derivatives thereof, and mixtures thereof. The optional inorganic ions include sodium, sulfate, nitrate and chloride ions.

A host of complexes of the type described above and their method of preparation are well known in the leather tanning art. These complexes are described in Shuttleworth and Russel, *Journal of The Society of Leather Trades' Chemists,* "The Kinetics of Chrome Tannage Part I.," United Kingdom, 1965, v. 49, p. 133–154; "Part III.," United Kingdom, 1965, v. 49, p. 251–260; "Part IV.," United Kingdom, 1965, v. 49, p. 261–268; and Von Erdman, *Das Leder,* "Condensation of Mononuclear Chromium (III) Salts to Polynuclear Compounds," Eduard Roether Verlag, Darmstadt, Germany, 1963, v. 14, p. 249; and are incorporated herein by reference. Udy, Marvin J., *Chromium, Volume 1: Chemistry of Chromium and its Compounds,* Reinhold Publishing Corp., N.Y., 1956, pp. 229–233; and Cotton and Wilkinson, *Advanced Inorganic Chemistry 3rd Ed.,* John Wiley & Sons, Inc., N.Y., 1972, pp. 836–839, further describe typical complexes which may be within the scope of the present invention and are incorporated herein by reference. The present invention is not limited to the specific complexes and mixtures thereof described in the references, but may include others satisfying the above-stated definition.

The gel is formed by admixing a carboxylate-containing polymer and crosslinking agent at the surface to form an injectable gelation solution. Surface admixing broadly encompasses inter alia mixing the solution in bulk at the surface prior to injection or simultaneously mixing the solution at or near the wellhead by in-line mixing means while injecting it. Admixing is accomplished for example by dissolving the starting materials for the crosslinking agent in an appropriate aqueous solvent. Exemplary starting materials include solid $CrAc_3.H_2O$, solid $Cr_3Ac_7(OH)_2$ or a solution labeled "Chromic Acetate 50% Solution" commercially available, for example, from McGean Chemical Co., Inc., 1250 Terminal Tower, Cleveland, Ohio 44113, U.S.A. The crosslinking agent solution is then mixed with an aqueous polymer solution to produce the gelation solution. Among other alternatives, the starting materials for the crosslinking agent can be dissolved directly in the aqueous polymer solution to form the gelation solution in a single step.

The aqueous solvent of the gelation solution may be fresh water or a brine having a total dissolved solids concentration up to the solubility limit of the solids in water. Inert fillers such as crushed or naturally fine rock material or glass beads can be added to the gelation solution to reinforce the gel network structure, although a solid-free solution is preferred. Special chemicals, such as biocides, can also be added to the gelation solution as required to solve specific problems.

The present process enables the practitioner to customize or tailor-make a gel having a predetermined gelation rate and predetermined gel properties of strength and stability from the above-described composition. The gelation rate is defined as the degree of gel formation as a function of time or, synonymously, the rate of crosslinking in the gelation solution. The degree of crosslinking may be quantified in terms of gel viscosity and/or strength. Gel strength is defined as the coherence of the gel network or resistance to deformation under external forces. Stability is defined as either thermal or phase stability. Thermal stability is the ability of a gel to withstand temperature extremes without degradation. Phase stability is the ability of a gel to resist syneresis which can detract from the gel structure and performance.

Tailor-making or customizing a gel in the manner of the present invention to meet the demands of a particular plugging application is provided in part by correlating the independent gelation parameters with the dependent variables of gelation rate and resultant gel strength and stability. The independent gelation parameters are the surface and in situ gelation conditions including: temperature, pH, ionic strength and specific electrolytic makeup of the solvent, polymer concentration, ratio of the weight of polymer to the combined weight of chromium III and carboxylate species in the mixture, degree of polymer hydrolysis, and average molecular weight of the polymer.

The operable ranges of the gelation parameters are correlated with the dependent variables of gelation rate and resultant gel properties by means including qualitative bottle testing and quantitative viscosimetric analysis. The operable ranges of a number of gelation parameters and their correlation with the dependent variables are described below.

The lower temperature limit of the gelation solution at the surface is the freezing point of the solution and the upper limit is essentially the thermal stability limit of the polymer. The solution is generally maintained at ambient temperature or higher at the surface. The temperature may be adjusted by heating or cooling the aqueous solvent. Increasing the temperature within the prescribed range increases the gelation rate.

The initial pH of the gelation solution is within a range of about 3 to 13 and preferably about 6 to 13. Although gelation can occur at an acidic pH, lowering the initial pH of the solution below 7 does not favor gelation. The initial pH of the solution is most preferably alkaline, i.e., greater than 7 to about 13. Increasing the pH within the prescribed range increases the rate of gelation.

The polymer concentration in the solution is about 500 ppm up to the solubility limit of the polymer in the solvent or the rheological constraints of the polymer solution, preferably about 1000 to about 200,000 ppm, and most preferably about 3000 to about 100,000. Increasing the polymer concentration increases the gelation rate and ultimate gel strength at a constant ratio of polymer to crosslinking agent.

The ionic strength of the solvent can be from that of deionized distilled water to that of a brine having an ion concentration approaching the solubility limit of the brine. Increasing the ionic strength of the solution can increase the gelation rate.

The weight ratio of polymer to chromium III and carboxylate species comprising the mixture is about 1:1 to about 500:1, preferably about 2.5:1 to about 100:1, and most preferably about 5:1 to about 40:1. Decreasing the ratio generally increases the gelation rate and up to a certain point generally increases the gel strength, especially at a constant high polymer concentration.

The degree of hydrolysis where an acrylamide polymer is employed is about 0 to 60% and preferably about 0 to 30%. Within the preferred range, increasing the degree of hydrolysis increases the gelation rate. Increasing the molecular weight of the polymer increases the gel strength.

It is apparent from these correlations that one can produce gels across a very broad range of gelation rates and gel properties as a function of the gelation conditions. Thus, to effect an optimum plugging job according to the present process, the practitioner predetermines the gelation rate and properties of the resultant gel which meet the demands of the given wellbore and thereafter produces the gel having these predetermined characteristics. The demands of the wellbore include the in situ gelation conditions such as temperature, connate water properties, size of the treatment volume, the pressure drop and permeability of the adjoining matrix as well as the post treatment conditions such as shut-in pressures. Analytical methods known to one skilled in the art are used to determine these demands which provide criteria to predetermine the gelation rate and resultant gel properties in the manner described above and continuing hereafter.

The gelation rate is advantageously sufficiently slow to enable preparation of the gelation solution at the surface and injection of the solution as a uniform slug into the wellbore. Too rapid a gelation rate produces excessive gelation of the solution at the surface which results in a solution that may be difficult, if not impossible, to inject into the wellbore to be plugged due to its rheological properties. At the same time, the gelation rate must be sufficiently rapid to enable completion of the reaction within a reasonable period of time to satisfy regulatory requirements.

The solution may be substantially ungelled before reaching the wellbore. However, at least partial gelation of the solution may be advantageous before the solution reaches the wellbore face to prevent the solution from penetrating the permeable rock bounding the wellbore. Substantial penetration of such material by the solution results in unnecessary and wasteful consumption of the solution. The solution advantageously gels to completion in the wellbore. The values of the independent variables in the process are carefully selected to achieve a gelation rate meeting these criteria.

The amount of solution injected into the wellbore is a function of the volume of the wellbore to be plugged and its performance demands. One skilled in the art can determine the required amount of a gel to plug a given wellbore.

The injection rate is a function of the gelation rate and operational constraints of injection pressure and pumping limits. The required injection rate is fixed such that all of the solution can be practically injected into the volume before it becomes unpumpable. The gelation time of the gel ranges from near instantaneous up to 48 hours or longer. Longer gelation times are limited by practical considerations.

Gels having a predetermined gelation rate and resultant gel properties to meet the demands of a given well are produced by adjusting and setting the surface gelation conditions as they correlate to the gelation rate and gel properties. Accordingly, the gels are produced in a manner which renders them insensitive to most extreme formation conditions. The gels can be stable at formation temperatures as high as 130° C. or more and at any formation pH contemplated. The gels are relatively insensitive to the stratigraphy of the rock, metal tubulars and other materials and chemicals employed in cementing operations. The gels can be employed in carbonate and sandstone strata and unconsolidated or consolidated strata having varying mineralogy. The gels are substantially insoluble in the formation fluids.

Once the gels are in place, they are substantially permanent and resistant to in situ degradation.

If it is desired to reactivate a plugged well, the gels may be reversible on contact with sodium hypochlorite, hydrogen peroxide or any other suitable peroxo compound. Alternatively, the gels can be drilled or bailed out of the wellbore.

The process is applicable to most plugging applications where Portland cement is presently used, simply by substituting the gel for the Portland cement and selecting the gelation conditions in the manner described herein. Although the invention has been described in the context of oil field injection and production wells, the plugging process is applicable to virtually any well one desires to plug, including abandoned waste injection wells, water wells, etc.

The strength of the gel can vary from an elastic jelly-like material to a rigid rubber-like material. The stronger materials are generally preferred where extreme shut-in pressures are encountered which could cause a weak plug to fail. PA is often preferred for such formulations because it has a slower gelation rate than PHPA which enables one to inject it into the wellbore before it sets up.

The following examples demonstrate the practice and utility of the present invention but are not to be construed as limiting the scope thereof.

Most of the examples are formatted as tables of data which describe the formulation and maturation of one or more gels. Each gel is represented in a table by a single experimental run. Data include the conditions for producing the gel and the quantitative or qualitative strength of the produced gel. The tables display data in a three-tier format. The first tier is the values of the fixed gelation conditions which are constant and common to every run in the table. The second tier is the values of the gelation conditions which vary among the different runs in the table but are constant for any given run. The third tier is the gel strength which varies as a function of time within each run. Qualitative gel strength is expressed in alphabetic code. Quantitative gel strength is simply the numerical value of apparent viscosity.

The following gel strength code and nomenclature are useful for interpreting the tables.

Gel Strength Code

A No detectable continuous gel formed: the bulk of the solution appears to have the same viscosity as the original polymer solution although isolated local gel balls may be present.

B Highly flowing gel: the gel appears to be only sightly more viscous than the initial polymer solution.

C Flowing gel: most of the gel flows to the bottle cap by gravity upon inversion.

D Moderately flowing gel: only a small portion (5–10%) of the gel does not readily flow to the bottle cap by gravity upon inversion (usually characterized as a tonguing gel).

E Barely flowing gel: the gel can barely flow to the bottle cap and/or a significant portion (>15%) of the gel does not flow by gravity upon inversion.

F Highly deformable nonflowing gel: the gel does not flow to the bottle cap by gravity upon inversion.

G Moderately deformable nonflowing gel: the gel deforms about half way down the bottle by gravity upon inversion.

H Slightly deformable nonflowing gel: only the gel surface slightly deforms by gravity upon inversion.

I Rigid gel: there is no gel surface deformation by gravity upon inversion.

J Ringing rigid gel: a tuning fork-like mechanical vibration can be felt upon tapping the bottle.

Nomenclature

% Hydrolysis: % of carboxylate groups on the acrylamide polymer based on the total number of acrylamide groups Polymer MW: average molecular weight of the acrylamide polymer Polymer Conc: acrylamide polymer concentration in the polymer solution (ppm)

Polymer Solvent: aqueous solvent in the polymer solution

Polymer pH: pH of the polymer solution

Total Ion Conc: total concentration of chromium III and acetate ions in the gelation solution (ppm)

Weight Ratio Polymer:Ions: weight ratio of acrylamide polymer to chromium III and acetate ions in the gelation solution Metal Ion Conc: chromium III concentration in the gelation solution Temp: gelation temperature (°C.)

Time: gelation time (hr)

Gel Code: gel strength code

Viscosity: apparent viscosity of the gelation solution at about 0.1 sec$^{-1}$ shear rate (cp)

Pressure: viscometer pressure (kPa)

The polymer solutions of the following examples are prepared by diluting aqueous acrylamide polymer solutions with an aqueous solvent. Where qualitative data are obtained, the dilute polymer solution is combined with a crosslinking agent solution in a 0.12 liter wide-mouth bottle to form a 0.05 liter sample. The sample is gelled in the capped bottle and the qualitative gel strength is determined by periodically inverting the bottle.

Where quantitative data are obtained, the polymer solution and crosslinking agent solution are combined in a variable pressure and temperature rheometer (viscometer), having an oscillatory mode of 0.1 rad/sec and 100% strain. The apparent viscosity at a shear rate of about 0.1 sec$^{-1}$ is recorded as a function of time.

In all of the examples, the crosslinking agent solution is that used in the present invention (i.e., a complex or mixture of complexes comprised of chromium III and acetate ions). The crosslinking agent solution of the present invention is prepared by dissolving solid $CrAc_3.H_2O$ or $CrAc_7(OH)_2$ in water or diluting a solution obtained commercially under the label of "Chromic Acetate 50% Solution".

EXAMPLE 1

About 2000 liters of a gelation solution is prepared by mixing a 2.2% by weight solution of a polyacrylamide in fresh water with a chromic carboxylate complex. The polyacrylamide has a molecular weight of 11,000,000. The weight ratio of polyacrylamide to complex is 20:1. The solution is placed in an abandoned injection well which is 244 m deep and cased with 10.3 cm I.D. casing. The gelation solution cures to a gel in the well after 72 hours. An injection leakoff test using water is conducted on the gel plugged well. No leakoff (i.e., <35 kPa) is detected in a 30 minute test at 6900 kPa applied water pressure.

EXAMPLE 2

| | | | | | | | | | |
|---|---|---|---|---|---|---|---|---|---|
| % Hydrolysis: | | 30 | | | | | | | |
| Polymer MW: | | 5,000,000 | | | | | | | |
| Polymer Conc: | | 8350 | | | | | | | |
| Polymer Solvent: | | 5,000 ppm NaCl in aqueous solution | | | | | | | |
| Polymer pH: | | 10.6 | | | | | | | |
| Run Number | 1 | 2 | 3 | 4 | 5 | 6 | 7 | 8 | 9 |
| Metal Ion Conc | 52 | 105 | 210 | 420 | 630 | 105 | 210 | 420 | 630 |
| Total Ion Conc | 250 | 500 | 1000 | 2000 | 3000 | 500 | 1000 | 2000 | 3000 |
| Weight Ratio Polymer:Ions | 33 | 16.7 | 8.4 | 4.2 | 2.8 | 16.7 | 8.4 | 4.2 | 2.8 |
| Temp | 22 | 22 | 22 | 22 | 22 | 60 | 60 | 60 | 60 |
| Time | | | | | Gel Code | | | | |
| 0.5 | A | A | A | A | A | B | B | C | C |
| 1.0 | A | A | A | A | A | C | C | D | E |
| 1.5 | A | A | A | A | A | D | E | G | H |
| 2.0 | B | B | B | B | B | E | F | H | I |
| 4.0 | B | B | B | C | D | G | G | H | I |
| 8.0 | B | B | C | D | E | G | H | I | J |
| 24 | D | E | E | F | H | G | H | I | J |
| 48 | E | E | E | G | I | G | H | I | J |
| 80 | G | G | G | H | I | G | H | I | J |
| 168 | G | G | H | I | J | G | I | J | J |
| 2040 | G | G | H | I | J | G | I | J | J |

The data show that gelation rate and gel strength increase as the temperature increases and as the weight ratio of polymer to ions decreases.

EXAMPLE 3

| | | | | | | | | |
|---|---|---|---|---|---|---|---|---|
| % Hydrolysis: | | 30 | | | | | | |
| Polymer MW: | | 5,000,000 | | | | | | |
| Polymer Conc: | | 8350 | | | | | | |
| Polymer Solvent: | | 5,000 ppm NaCl in aqueous solution | | | | | | |
| Temp: | | 22 | | | | | | |
| Run Number | 1 | 2 | 3 | 4 | 5 | 6 | 7 | 8 |
| Polymer pH | 10.6 | 10.6 | 10.6 | 10.6 | 8.0 | 8.0 | 8.0 | 8.0 |
| Metal Ion Conc | 105 | 210 | 420 | 630 | 105 | 210 | 420 | 630 |
| Total Ion Conc | 500 | 1000 | 2000 | 3000 | 500 | 1000 | 2000 | 3000 |
| Weight Ratio Polymer:Ions | 16.7 | 8.4 | 4.2 | 2.8 | 16.7 | 8.4 | 4.2 | 2.8 |
| Time | | | | Gel Code | | | | |
| 0.5 | A | A | A | A | A | A | A | A |
| 1.0 | A | A | A | A | A | A | A | A |
| 1.5 | A | A | A | A | A | A | A | A |
| 2.0 | B | B | B | B | A | A | A | A |
| 2.5 | B | B | B | B | A | A | A | A |
| 4.0 | B | B | C | D | A | B | B | B |
| 5.0 | B | C | D | D | A | B | B | B |
| 6.0 | B | C | D | E | A | B | B | B |
| 7.0 | B | C | D | E | A | B | B | B |
| 8.0 | B | C | D | E | B | B | B | B |
| 24 | E | E | F | G | B | B | B | C |
| 28 | E | E | G | I | B | B | B | C |
| 48 | E | E | H | I | B | B | B | C |
| 80 | G | G | H | I | B | C | C | G |
| 168 | G | H | I | J | C | E | G | H |
| 2040 | G | H | I | J | E | E | G | — |

| Run Number | 9 | 10 | 11 | 12 | 13 | 14 | 15 | 16 |
|---|---|---|---|---|---|---|---|---|
| Polymer pH | 7.0 | 7.0 | 7.0 | 7.0 | 6.0 | 6.0 | 6.0 | 6.0 |
| Metal Ion Conc | 105 | 210 | 420 | 630 | 105 | 210 | 420 | 630 |
| Total Ion Conc | 500 | 1000 | 2000 | 3000 | 500 | 1000 | 2000 | 3000 |
| Weight Ratio Polymer:Ions | 16.7 | 8.4 | 4.2 | 2.8 | 16.7 | 8.4 | 4.2 | 2.8 |
| Time | | | | Gel Code | | | | |
| 0.5 | A | A | A | A | A | A | A | A |
| 1.0 | A | A | A | A | A | A | A | A |
| 1.5 | A | A | A | A | A | A | A | A |
| 2.0 | A | A | A | A | A | A | A | B |
| 2.5 | A | A | A | A | A | A | A | A |
| 4.0 | A | A | A | A | A | A | B | B |
| 5.0 | A | A | B | B | A | A | B | B |
| 6.0 | A | B | B | B | A | A | B | B |
| 7.0 | A | B | B | B | A | B | B | B |
| 8.0 | B | B | B | B | B | B | B | B |
| 24 | B | C | C | C | B | B | C | C |
| 28 | B | C | D | E | B | C | D | F |
| 48 | B | C | D | E | B | C | D | F |
| 80 | B | C | D | E | B | C | D | F |
| 168 | B | D | E | H | D | D | E | G |
| 2040 | E | F | G | — | E | F | G | — |

| Run Number | 17 | 18 | 19 | 20 |
|---|---|---|---|---|
| Polymer pH | 4.0 | 4.0 | 4.0 | 4.0 |
| Metal Ion Conc | 105 | 210 | 420 | 630 |
| Total Ion Conc | 500 | 1000 | 2000 | 3000 |
| Weight Ratio Polymer:Ions | 16.7 | 8.4 | 4.2 | 2.8 |
| Time | | Gel Code | | |
| 0.5 | A | A | A | A |
| 1.0 | A | A | A | A |
| 1.5 | A | A | A | A |
| 2.0 | A | A | A | B |
| 2.5 | A | A | A | B |
| 4.0 | A | A | A | B |
| 5.0 | A | A | B | B |
| 6.0 | A | A | B | C |
| 7.0 | A | A | B | C |
| 8.0 | A | B | B | C |
| 24 | B | C | D | D |
| 28 | B | C | D | D |
| 48 | B | C | D | E |
| 80 | B | C | F | G |
| 168 | B | D | G | I |
| 2040 | D | G | — | — |

The data show that gelation rate and gel strength decrease as pH of the polymer solution decreases.

EXAMPLE 4

| % Hyorolysis: | <1 | | |
|---|---|---|---|
| Polymer MW: | 11,000,000 | | |
| Polymer Conc: | 20,000 | | |
| Polymer Solvent: | Denver Tap Water | | |
| Temp: | 60 | | |
| Run Number: | 1 | 2 | 3 |
| Weight Ratio Polymer:Ions | 40 | 20 | 10 |
| Time | | Viscosity | |
| 0.0 | 940,000 | 940,000 | 940,000 |
| 0.5 | 500,000 | 1,300,000 | 1,300,000 |
| 1.0 | 800,000 | 2,300,000 | 2,300,000 |
| 2.0 | 1,100,000 | 2,800,000 | 3,500,000 |
| 4.0 | 1,200,000 | 3,200,000 | 4,300,000 |
| 8.0 | 1,300,000 | 3,400,000 | 4,700,000 |
| 12 | 1,300,000 | 3,400,000 | 4,700,000 |
| 16 | 1,400,000 | 3,400,000 | 4,700,000 |
| 20 | 1,400,000 | 3,400,000 | 4,700,000 |

Viscosity data confirm the observations of Examples 2 and 3 that decreasing the weight ratio of polymer to ions increases the gelation rate.

The mature gel of Run 2 exhibits properties of a Bingham plastic. Its yield stress is determined by attempting to flow the gel through a 1.4 mm diameter orifice at an applied pressure for four hours. The gel does not flow through the orifice at applied pressures up to 3450 kPa for tests conducted at temperatures ranging from 22° C. to 124° C.

EXAMPLE 5

| % Hydrolysis: | <1 | | |
|---|---|---|---|
| Polymer MW: | 11,000,000 | | |
| Polymer Conc: | 20,000 | | |
| Polymer Solvent: | Denver Tap Water | | |
| Weight Ratio Polymer:Ions: | 20 | | |
| Run Number | 1 | 2 | 3 |
| Temp | 23 | 43 | 60 |
| Time | | Viscosity | |
| 0.0 | 50,000 | 50,000 | 50,000 |
| 0.2 | 50,000 | 50,000 | 875,000 |
| 0.5 | 50,000 | 100,000 | 1,400,000 |
| 1.0 | 60,000 | 200,000 | 2,250,000 |
| 2.0 | 75,000 | 600,000 | 2,900,000 |
| 4.0 | 100,000 | 1,125,000 | 3,275,000 |
| 8.0 | 125,000 | 1,800,000 | 3,400,000 |
| 12 | 175,000 | 2,100,000 | 3,425,000 |
| 16 | 200,000 | 2,300,000 | 3,425,000 |
| 20 | 300,000 | 2,500,000 | 3,425,000 |

Viscosity data confirm that increasing the temperature increases the gelation rate.

EXAMPLE 6

| % Hyorolysis: | <1 | | |
|---|---|---|---|
| Polymer MW: | 11,000,000 | | |
| Polymer Conc: | 20,000 | | |
| Polymer Solvent: | Denver Tap Water | | |
| Weight Ratio Polymer:Ions: | 20 | | |
| Temp: | 60 | | |
| Run Number: | 1 | 2 | 3 |
| Pressure | 690 | 3450 | 6900 |
| Time | | Viscosity | |
| 0.0 | 91,000 | 91,000 | 91,000 |
| 0.2 | 250,000 | 800,000 | 250,000 |
| 0.5 | 800,000 | 1,400,000 | 800,000 |
| 1.0 | 1,700,000 | 2,200,000 | 2,000,000 |
| 2.0 | 2,300,000 | 2,800,000 | 2,700,000 |
| 3.0 | 2,500,000 | 3,200,000 | 3,200,000 |
| 4.0 | 2,700,000 | 3,300,000 | 3,400,000 |
| 8.0 | 2,750,000 | 3,400,000 | 3,500,000 |
| 12 | 2,800,000 | 3,400,000 | 3,500,000 |
| 16 | 2,800,000 | 3,400,000 | 3,500,000 |
| 20 | 2,800,000 | 3,400,000 | 3,500,000 |

Viscosity data show that gelation rate is a weak function of pressure. The rate increases slightly with pressure.

EXAMPLE 7

| Polymer MW: | 5,000,000 | |
|---|---|---|
| Polymer Conc: | 10,000 | |
| Polymer Solvent: | Denver Tap Water | |
| Polymer pH: | 8.0 | |
| Temp: | 22 | |
| Metal Ion Conc: | 207 | |
| Total Ion Conc: | 990 | |
| Weight Ratio Polymer:Ions: | 10.0 | |
| Run Number | 1 | 2 |
| % Hydrolysis | 30 | 2 |
| Time | | Gel Code |
| 0.25 | B | A |
| 2.0 | B | A |
| 3.0 | C | A |
| 4.0 | C | A |
| 5.0 | C | B |
| 8.0 | E | B |
| 23 | F | B |
| 48 | E | B |
| 72 | F | B |
| 103 | F | B |
| 268 | G | B |

The data show that the rate of gelation of partially hydrolyzed polyacrylamide is considerably faster than that of substantially unhydrolyzed polyacrylamide. Thus, the gelation rate of an acrylamide polymer solution can be slowed by reducing the degree of hydrolysis of the acrylamide groups.

EXAMPLE 8

| Polymer MW: | 11,000,000 | |
|---|---|---|
| Polymer Conc: | 12,500 | |
| Polymer Solvent: | Denver Tap Water | |
| Temp: | 40 | |
| Weight Ratio Polymer:Ions: | 20 | |
| Pressure: | 3450 | |
| Run Number | 1 | 2 |
| % Hydrolysis | 30 | 2 |
| Polymer pH | 10 | 9 |
| Time | | Viscosity |
| 0 | 190,000 | 8,000 |
| 0.1 | 255,000 | 10,000 |
| 0.5 | 300,000 | 15,000 |
| 1 | 350,000 | 25,000 |
| 2 | 415,000 | 40,000 |
| 3 | 460,000 | 70,000 |
| 4 | 500,000 | 100,000 |
| 8 | 575,000 | 210,000 |
| 11 | 600,000 | 300,000 |
| 14 | 605,000 | 355,000 |
| 18 | 605,000 | 425,000 |

-continued

| Polymer MW: | 11,000,000 |
| Polymer Conc: | 12,500 |
| Polymer Solvent: | Denver Tap Water |
| Temp: | 40 |
| Weight Ratio Polymer:Ions: | 20 |
| Pressure: | 3450 |

| Run Number | 1 | 2 |
|---|---|---|
| 20 | 605,000 | 460,000 |
| 36 | 605,000 | 610,000 |

Viscosity data confirm the observations of Example 7.

EXAMPLE 9

| % Hydrolysis: | <1 |
| Polymer MW: | 5,000,000 |
| Polymer Conc: | 20,000 |
| Polymer Solvent: | Denver Tap Water |
| Polymer pH: | 8.8 |

| Run Number | 1 | 2 | 3 | 4 | 5 | 6 | 7 | 8 |
|---|---|---|---|---|---|---|---|---|
| Metal Ion Conc | 404 | 206 | 104 | 52.2 | 404 | 206 | 104 | 52.2 |
| Total Ion Conc | 1420 | 980 | 495 | 244 | 1920 | 980 | 495 | 249 |
| Weight Ratio Polymer:Ions | 10 | 20 | 40 | 80 | 10 | 20 | 40 | 80 |
| Temp | 22 | 22 | 22 | 22 | 60 | 60 | 60 | 60 |
| Time | | | | Gel Code | | | | |
| 0.5 | A | A | A | A | B | B | A | A |
| 1.0 | A | A | B | B | G | G | F | C |
| 2.0 | A | A | B | B | I | I | I | I |
| 3.0 | B | B | B | B | J | J | J | J |
| 5.0 | B | B | B | B | J | J | J | J |
| 6.0 | C | C | C | C | J | J | J | J |
| 7.0 | E | E | E | E | J | J | J | J |
| 8.0 | G | G | F | F | J | J | J | J |
| 25 | H | H | H | H | J | J | J | J |
| 48 | H | H | H | H | J | J | J | J |
| 96 | I | I | I | I | J | J | J | J |
| 120 | I | I | I | I | J | J | J | J |
| 144 | J | J | J | J | J | J | J | J |
| 1032 | J | J | J | J | J | — | — | — |

The data show that there is a functional relation between gelation rate and temperature for polyacrylamide gels as well as partially hydrolyzed polyacrylamide gels.

EXAMPLE 10

| % Hydrolysis: | 30 |
| Polymer MW: | 5,000,000 |
| Polymer Solvent: | Distilled Water |
| Polymer pH: | 8.0 |
| Temp: | 22 |
| Weight Ratio Polymer:Ions: | 10 |

| Run Number | 1 | 2 | 3 | 4 | 5 | 6 |
|---|---|---|---|---|---|---|
| Metal Ion Conc | 310 | 207 | 157 | 105 | 63 | 42 |
| Total Ion Conc | 1,480 | 990 | 747 | 499 | 300 | 200 |
| Polymer Conc | 15,000 | 10,000 | 7,500 | 5,000 | 3,000 | 2,000 |
| Time | | | Gel Code | | | |
| 0.25 | B | B | B | A | A | A |
| 0.5 | C | B | B | A | A | A |
| 1.0 | C | B | B | A | A | A |
| 2.0 | E | B | B | A | A | A |
| 3.0 | E | C | B | A | A | A |
| 4.0 | G | C | B | A | A | A |
| 5.0 | I | C | B | B | A | A |
| 8.0 | I | E | C | B | B | A |
| 23 | I | F | C | B | B | A |
| 48 | I | F | C | C | B | A |

-continued

| % Hydrolysis: | 30 |
| Polymer MW: | 5,000,000 |
| Polymer Solvent: | Distilled Water |
| Polymer pH: | 8.0 |
| Temp: | 22 |
| Weight Ratio Polymer:Ions: | 10 |

| Run Number | 1 | 2 | 3 | 4 | 5 | 6 |
|---|---|---|---|---|---|---|
| 72 | I | G | D | C | B | A |
| 103 | I | G | F | C | B | B |
| 268 | I | H | F | D | C | B |

The data show that decreasing the polymer concentration while maintaining the same weight ratio of polymer to ions substantially decreases the gelation rate and gel strength.

EXAMPLE 11

| % Hydrolysis: | <1 |
| Polymer Solvent: | Denver Tap Water |
| Weight Ratio Polymer:Ions: | 10 |
| Temp: | 60 |

| Run Number | 1 | 2 | 3 |
|---|---|---|---|
| Polymer Conc | 30,000 | 20,000 | 15,000 |
| Time | | Viscosity | |
| 0.0 | 3,000 | 3,000 | 3,000 |
| 0.2 | 700,000 | 700,000 | 200,000 |
| 0.5 | 1,700,000 | 1,600,000 | 400,000 |
| 1.0 | 3,200,000 | 2,300,000 | 800,000 |
| 2.0 | 4,000,000 | 2,800,000 | 1,000,000 |
| 4.0 | 4,600,000 | 3,300,000 | 1,200,000 |
| 8.0 | 4,600,000 | 3,300,000 | 1,200,000 |
| 20 | 4,600,000 | 3,300,000 | 1,200,000 |

Viscosity data confirm the observations of Example 10 that gelation rate decreases as polymer concentration decreases.

EXAMPLE 12

| % Hydrolysis: | 30 |
| Polymer Conc: | 3,000 |
| Polymer Solvent: | 3,000 ppm NaCl in aqueous solution |
| Polymer pH: | 10.1 |
| Temp: | 22 |
| Metal Ion Conc: | 155 |
| Total Ion Conc: | 600 |
| Weight Ratio Polymer:Ions: | 5.0 |

| Run Number | 1 | 2 |
|---|---|---|
| Polymer MW | 5,000,000 | 11,000,000 |
| Time | Gel Code | |
| 0.5 | A | A |
| 1.0 | A | B |
| 3.0 | A | B |
| 4.0 | B | C |
| 5.0 | B | E |
| 11 | B | E |
| 24 | C | F |
| 48 | C | G |
| 56 | D | G |
| 101 | D | G |
| 156 | E | G |
| 192 | E | G |
| 269 | F | G |

The data show that gelation rate and gel strength increase as the molecular weight of the polymer increases.

EXAMPLE 13

| % Hydrolysis: | <1 |
| --- | --- |
| Polymer Conc: | 20,000 |
| Polymer Solvent: | Denver Tap Water |
| Weight Ratio Polymer:Ions: | 20 |
| Temp: | 60 |

| Run Number | 1 | 2 |
| --- | --- | --- |
| Polymer MW | 5,000,000 | 11,000,000 |
| Time | Viscosity | |
| 0.0 | 100,000 | 100,000 |
| 0.5 | 300,000 | 1,400,000 |
| 1.0 | 800,000 | 2,200,000 |
| 2.0 | 1,300,000 | 2,800,000 |
| 4.0 | 1,800,000 | 3,200,000 |
| 6.0 | 2,000,000 | 3,300,000 |
| 8.0 | 2,100,000 | 3,400,000 |
| 12 | 2,200,000 | 3,400,000 |
| 16 | 2,200,000 | 3,400,000 |

Viscosity data confirm the observations of Example 12.

Examples 2–13 show that the gelation rate of the polymer and crosslinking agent of the present invention can be adjusted to any desired rate and gel strength by selecting the values of the independent variables such as polymer or crosslinking agent concentration, polymer molecular weight, temperature, pH, etc. This is particularly useful in customizing a gel for a specific plugging application.

Various salts and gases commonly found in oil field brines are added to the gelation solution of Examples 14 and 15 to determine the sensitivity of the gelation reaction to in situ fluids.

EXAMPLE 14

| % Hydrolysis: | 30 |
| --- | --- |
| Polymer MW: | 5,000,000 |
| Polymer Conc: | 8350 |
| Polymer pH: | 9.6 |
| Temp: | 22 |
| Metal Ion Conc: | 259 |
| Total Ion Conc: | 1,000 |
| Weight Ratio Polymer:Ions: | 8.4 |

| Run Number | 1 | 2 | 3 | 4 |
| --- | --- | --- | --- | --- |
| Polymer Solvent | fresh water | 3,000 ppm NaCl | 10,000 ppm NaCl | 29,200 ppm NaCl |
| Time | Gel Code | | | |
| 0.5 | B | B | B | B |
| 1.0 | B | C | D | D |
| 2.0 | B | C | D | D |
| 3.0 | B | D | D | D |
| 4.0 | B | D | D | D |
| 5.0 | B | E | E | E |
| 7.0 | B | E | E | E |
| 24 | D | F | F | F |
| 51 | G | G | G | G |
| 79 | I | I | I | I |
| 480 | I | I | I | I |

EXAMPLE 15

| % Hydrolysis: | 30 |
| --- | --- |
| Polymer MW: | 5,000,000 |
| Polymer Conc: | 8350 ppm |
| Polymer Solvent: | 5,000 ppm NaCl in aqueous solution |
| Polymer pH: | 7.0 |
| Temp: | 22 |
| Metal Ion Conc: | 259 |
| Total Ion Conc: | 1000 |
| Weight Ratio Polymer:Ions: | 8.4 |

| Run Number | 1 | 2 | 3 | 4 | 5 |
| --- | --- | --- | --- | --- | --- |
| Additive: | none (control) | $CO_2$ | $NaNO_3$ | $MgCl_2$ | $CaCl_2$ |
| Additive Conc (ppm): | — | saturated solution | 2000 | 2000 | 1000 |
| Time | Gel Code | | | | |
| 1.0 | A | A | A | A | A |
| 4.0 | A | A | A | A | A |
| 5.0 | B | B | B | B | B |
| 6.0 | B | B | B | B | B |
| 7.0 | B | B | B | B | B |
| 8.0 | C | C | C | C | C |
| 24 | C | C | C | C | C |
| 72 | D | D | C | D | D |
| 120 | E | E | E | E | E |
| 264 | E | E | E | E | F |
| 288 | E | E | E | E | F |
| 408 | E | E | E | E | F |

| Run Number | 6 | 7 | 8 | 9 | 10 |
| --- | --- | --- | --- | --- | --- |
| Additive: | $Na_2SO_4$ | $NH_4Cl$ | KCl | $NaHCO_3$ | $Na_2CO_3$ |
| Additive Conc (ppm): | 3000 | 100 | 400 | 2000 | 100 |
| Time | Gel Code | | | | |
| 1.0 | A | A | A | A | A |
| 4.0 | A | A | A | A | A |
| 5.0 | B | B | B | B | B |
| 6.0 | B | B | B | B | B |
| 7.0 | B | B | C | B | B |
| 8.0 | C | C | C | B | B |
| 24 | C | C | C | C | C |
| 72 | D | D | D | D | D |
| 120 | E | D | D | E | E |
| 264 | F | F | F | F | F |
| 288 | F | F | F | F | F |
| 408 | F | F | F | F | F |

The data of Examples 14 and 15 show that the gelation reaction is relatively insensitive to these additives.

Examples 16–18 utilize actual or synthetic field injection waters in the gelation solutions.

EXAMPLE 16

| % Hydrolysis: | 30 |
| --- | --- |
| Polymer MW: | 11,000,000 |
| Polymer Conc: | 3000 |
| Polymer Solvent: | Synthetic Field Injection Water A* |
| Polymer pH: | 10.4 |
| Metal Ion Conc: | 77.5 |
| Total Ion Conc: | 299 |
| Weight Ratio Polymer:Ions: | 10.0 |

| Run Number | 1 | 2 |
| --- | --- | --- |
| Temp | 22 | 43** |
| Time | Gel Code | |
| 0.50 | B | B |
| 0.75 | C | C |
| 1.0 | C | D |
| 1.5 | C | D |
| 2.0 | D | E |
| 6.0 | D | E |
| 8.0 | E | E |
| 35 | F | F |
| 168 | F | F |
| 240 | G | F |
| 269 | G | G |
| 504 | G | G |

*Synthetic Field Injection Water A has the following composition:

| | g/l |
| --- | --- |
| $CaSO_4.H_2O$ | 0.594 |
| $MgSO_4$ | 0.788 |
| $NaHCO_3$ | 1.53 |
| $CaCl_3$ | 0.655 |

-continued

| | |
|---|---|
| Na$_2$SO$_4$ | 1.52 |
| K$_2$SO$_4$ | 0.452 |

**Temperature of Field A.

EXAMPLE 17

| % Hydrolysis: | 30 | | | |
|---|---|---|---|---|
| Polymer MW: | 5,000,000 | | | |
| Polymer Solvent: | Actual Field Injection Water B* | | | |
| Temp: | 60** | | | |
| Run Number | 1 | 2 | 3 | 4 |
| Polymer Conc | 3000 | 4000 | 5000 | 8000 |
| Polymer pH | 8.5 | 8.5 | 8.5 | 9.0 |
| Metal Ion Conc | 54.5 | 72.6 | 64.9 | 90.7 |
| Total Ion Conc | 240 | 320 | 286 | 399 |
| Weight Ratio Polymer:Ions | 12.5 | 12.5 | 17.5 | 20 |
| Time | Gel Code | | | |
| 0.5 | A | A | A | A |
| 1.0 | A | A | A | C |
| 1.5 | A | B | B | D |
| 2.0 | B | D | D | E |
| 3.0 | C | D | D | F |
| 4.0 | D | D | D | F |
| 5.0 | D | E | E | F |
| 12 | D | E | E | F |
| 27 | D | D | D | F |
| 504 | D | D | D | F |

*Actual Field Injection Water B has a TDS of 0.58%,
H$_2$S >100 ppm, and is comprised of the following primary ionic constituents:

| | ppm |
|---|---|
| Na$^+$ | 252 |
| Mg$^{2+}$ | 97 |
| Ca$^{2+}$ | 501 |
| Cl$^-$ | 237 |
| SO$_4^{2-}$ | 1500 |
| HCO$_3^-$ | 325 |

**Temperature of Field B.

EXAMPLE 18

| % Hydrolysis: | 30 | | |
|---|---|---|---|
| Polymer Solvent: | Synthetic Field Injection Water C* | | |
| Polymer pH: | 7.5 | | |
| Temp: | 22** | | |
| Weight Ratio Polymer:Ions: | 15 | | |
| Run Number | 1 | 2 | 3 |
| Polymer MW | 11,000,000 | 11,000,000 | 11,000,000 |
| Polymer Conc | 3,000 | 5,000 | 8,000 |
| Metal Ion Conc | 45.4 | 75.7 | 121 |
| Total Ion Conc | 200 | 333 | 533 |
| Time | Gel Code | | |
| 0.25 | A | A | A |
| 0.5 | A | A | B |
| 4.0 | A | A | B |
| 5.0 | A | A | C |
| 6.0 | A | B | C |
| 7.0 | A | C | D |
| 24 | B | D | D |
| 96 | C | D | G |
| 150 | D | D | G |
| 197 | D | D | H |
| 936 | D | D | H |

*Synthetic Field Injection Water C has the following compositon:

| | g/l |
|---|---|
| Na$_2$CO$_3$ | 0.249 |
| NH$_4$Cl | 0.085 |
| CaCl$_2$ | 0.821 |
| MgCl$_2$.6H$_2$O | 1.78 |
| Na$_2$SO$_4$ | 1.09 |
| NaCl | 4.80 |
| NaHCO$_3$ | 2.09 |

**Temperature of Field C.

Examples 16-18 show that gels can be formulated in saline actual field waters. The concentration and proportions of gel components can be selected to form stable gels even in complex injection waters such as B and C at the formation temperature.

While the foregoing preferred embodiments of the invention have been described and shown, it is understood that the alternatives and modifications, such as those suggested and others, may be made thereto and fall within the scope of the invention.

We claim:

1. A process for plugging an abandoned well in fluid communication with a subterranean formation below an earthen surface, comprising:

(a) admixing a gelation solution at the surface consisting essentially of a water-soluble carboxylate-containing polymer, a complex capable of crosslinking said polymer and formed of at least one chromic species and at least one acetate species, and a solvent for said polymer and said complex;

(b) injecting said gelation solution into a wellbore of said abandoned well; and (c) crosslinking said gelation solution in said wellbore to substantial completion to form a non-flowing rigid gel which substantially plugs said abandoned well.

2. The process of claim 1 wherein the weight ratio of said polymer to said complex in said gelation solution is about 2.5:1 to about 100:1.

3. The process of claim 1 wherein said carboxylate-containing polymer is an acrylamide polymer.

4. The process of claim 1 wherein said formation contains hydrocarbons.

5. The process of claim 4 wherein said well is a fluid injection well.

6. The process of claim 4 wherein said well is a hydrocarbon production well.

7. A process for plugging an abandoned well in fluid communication with a subterranean formation below an earthen surface, comprising:

(a) admixing a gelation solution at the surface consisting essentially of a water-soluble carboxylate-containing polymer, a complex capable of crosslinking said polymer and formed of at least one chromic species, at least one acetate species, and at least one species selected from the group consisting of electronegative oxygen species, electronegative hydroxide species, inorganic monovalent ions, inorganic divalent ions, water molecules, and mixtures thereof, and a solvent for said polymer and said complex;

(b) injecting said gelation solution into a wellbore of said abandoned well; and (c) crosslinking said gelation solution in said wellbore to substantial completion to form a non-flowing rigid gel which substantially plugs said abandoned well.

8. The process of claim 7 wherein the weight ratio of said polymer to said complex in said gelation solution is about 2.5:1 to about 100:1.

9. The process of claim 7 wherein said carboxylate-containing polymer is an acrylamide polymer.

10. The process of claim 7 wherein said formation contains hydrocarbons.

11. The process of claim 1 wherein said well is a fluid injection well.

12. The process of claim 7 wherein said well is a hydrocarbon production well.

13. The process of claim 7 wherein said gelation solution is partially gelled prior to the injection of step (b).

14. The process of claim 1 wherein said gelation solution is partially gelled prior to the injection of step (b).

* * * * *

UNITED STATES PATENT AND TRADEMARK OFFICE
CERTIFICATE OF CORRECTION

PATENT NO. : 4,730,675

DATED : March 15, 1988

INVENTOR(S) : Noel D. Wygant and Robert D. Sydansk

It is certified that error appears in the above-identified patent and that said Letters Patent is hereby corrected as shown below:

Col. 7, line 53: Delete "sightly" and insert --slightly--.
Col. 19, line 5: Delete "claim 1" and insert --claim 10--.
Col. 20, line 1: Delete "claim 7" and insert --claim 10--.

Signed and Sealed this

Twenty-fifth Day of October, 1988

Attest:

DONALD J. QUIGG

Attesting Officer

Commissioner of Patents and Trademarks